E. B. BAKER.

Car Wheel.

No. 6,024.

2 Sheets—Sheet 1.

Patented Jan. 9, 1849.

E. B. BAKER.
Car Wheel.

No. 6,024.

2 Sheets—Sheet 2.

Patented Jan. 9, 1849.

UNITED STATES PATENT OFFICE.

EDWARD B. BAKER, OF ST. PHILIP PARISH, SOUTH CAROLINA.

CAST-IRON CAR-WHEEL.

Specification of Letters Patent No. 6,024, dated January 9, 1849.

*To all whom it may concern:*

Be it known that I, EDWARD BONNEAU BAKER, of the parish of St. Philip, in the district of Charleston and State of South Carolina, have invented a new and Improved Railroad Chill-Wheel; and do hereby declare that the following is a full and exact description.

The nature of my invention consists in providing a single plate to connect the hub and rim, the said plate being convex on the inner side and concave on the outer, with arms curving from the hub to the rim and reversed to the right on the one side of the plate and to the left on the other; thus adding strength and durability to the reverse arm concavo-convex single plate chill wheel.

To enable others skilled in the art to make and use my invention I will proceed to describe its construction and the mode of tempering the same to prevent it from breaking in cooling.

I construct my reverse arm concavo-convex single plate chill wheel three feet in diameter and in any of the known forms, substituting the above named plate and arms in the place of the arms or spokes now in general use.

Figure 2:
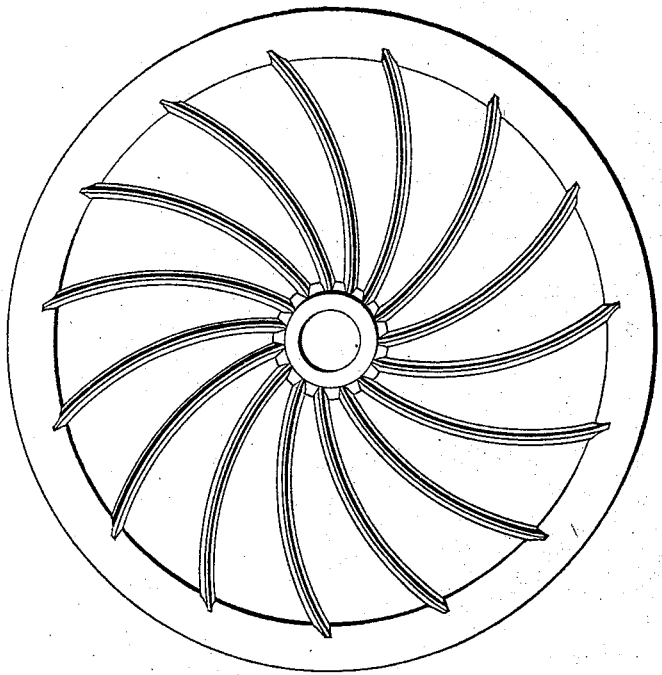
Figure 3:
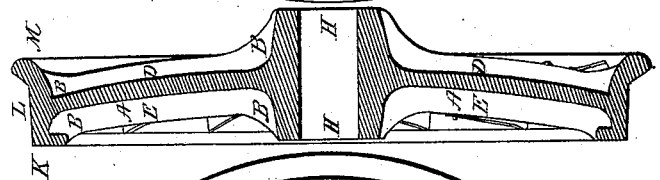
Figure 1:
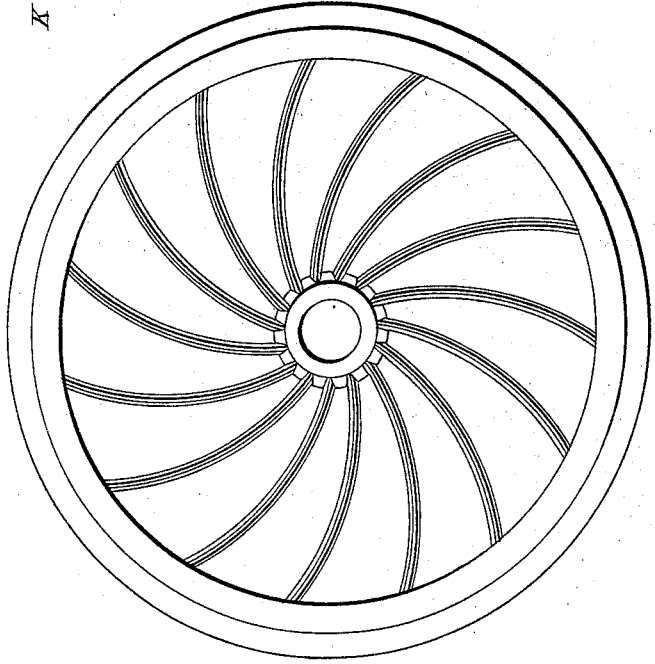
Figure 4:
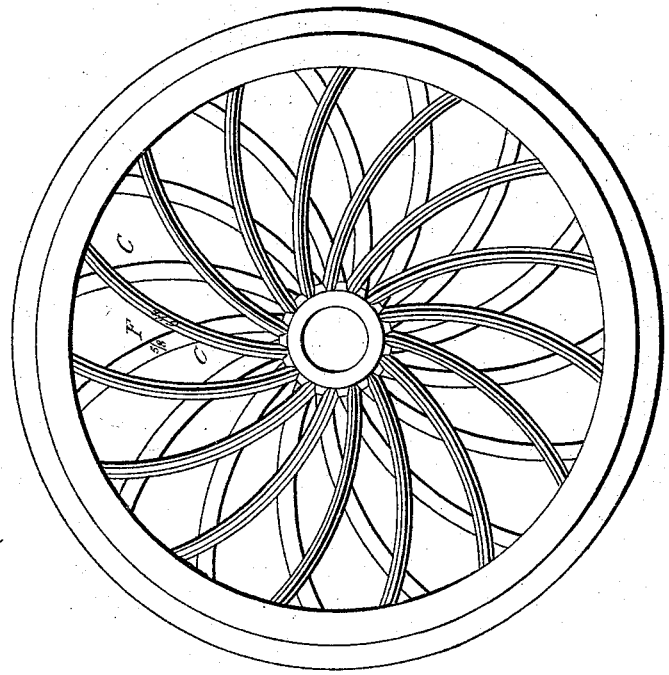
Figure 5:
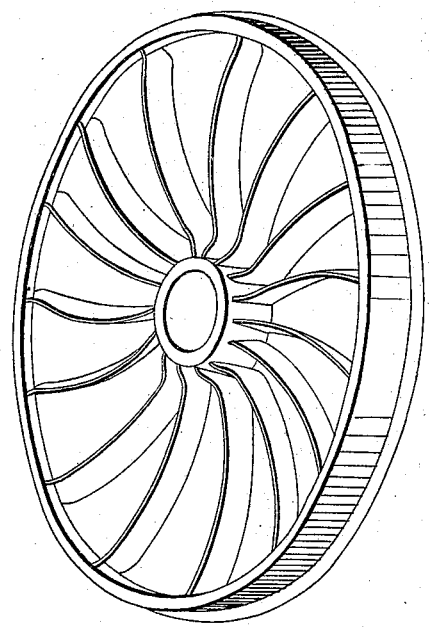

Figure 1, represents the outer or concave view of the wheel. Fig. 2, represents the inner or convex view of the wheel. Fig. 3, represents the sectional view of the wheel. Fig. 4, represents the skeleton view of the wheel. Fig. 5, represents the perspective view of the wheel.

A A, in Fig. 3, represents the plate which is placed near the center of the rim and hub and is convex on the one side and concave on the other and is $\frac{3}{8}$ of an inch thick. Fig. 4, represents curved arms running from the hub to the rim and reversed, so that each arm on the one side crosses two on the other as shown at C C. The said arms rise at the hub and rim as shown at B B in Fig. 3, and vary from 1 to $1\frac{1}{4}$ inches in depth on the convex side of the plate and from 2 to $2\frac{1}{4}$ inches in depth on the concave side at D and E in Fig. 3 and are $\frac{3}{8}$ of an inch thick at the bottom and $\frac{1}{4}$ of an inch at the top as shown at F and G in Fig. 4. The hub is 6 inches in diameter and 9 inches in depth as shown at H H and I I in Fig. 3. K L M in Fig. 3 represents the rim or tread which is one inch thick at M and $\frac{7}{8}$ of an inch at K and $1\frac{3}{8}$ inches thick in the middle at L where it connects with the plate as seen in Fig. 3.

The reverse arm concavo-convex single plate chill wheel can be used as truck, tender and driving wheels by increasing the thickness of the plate, arms, hub and rim in proportion to the diameter and strength required. Slotting and banding, which are so expensive are not required in the reverse arm concavo-convex single plate chill wheel. I will therefore describe the mode of tempering the same. I remove the wheel from the chill in which it is cast as soon as possible, having the concave side up; the outer rim or tread and a part of the plate are covered with sand which assists in keeping up the temperature of the rim. The hub of the wheel is left exposed and water poured upon it to reduce its temperature to that of the rim. It is then left to cool off gradually.

What I claim as my invention and desire to secure by Letters Patent is—

The single plate which connects the hub and rim with curved arms thereon reversed to the right on the one side of the plate and to the left on the other and likewise my mode of tempering the said wheels herein described by which all injury to the chill of the wheel is avoided.

EDWARD BONNEAU BAKER.

Witnesses:
WM. H. BARTLETT,
THOS. WARING.